United States Patent
Sugiyama (10) Patent No.: US 10,731,576 B2
(45) Date of Patent: Aug. 4, 2020

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Satoshi Sugiyama, Mishima (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 263 days.

(21) Appl. No.: 15/723,370

(22) Filed: Oct. 3, 2017

(65) Prior Publication Data

US 2018/0128192 A1 May 10, 2018

(30) Foreign Application Priority Data

Nov. 4, 2016 (JP) .................. 2016-216400

(51) Int. Cl.
*F02D 41/00* (2006.01)
*F02D 41/22* (2006.01)
(Continued)

(52) U.S. Cl.
CPC .......... *F02D 41/0007* (2013.01); *F02D 9/02* (2013.01); *F02D 41/0047* (2013.01); *F02D 41/22* (2013.01); *F02M 26/02* (2016.02); *F02M 26/64* (2016.02); *F02D 13/0207* (2013.01); *F02D 2041/001* (2013.01); *F02D 2041/0017* (2013.01); *F02D 2041/227* (2013.01); *F02D 2200/1004* (2013.01); *F02D 2250/26* (2013.01); *Y02T 10/144* (2013.01); *Y02T 10/47* (2013.01)

(58) Field of Classification Search
CPC ...... F02D 41/007; F02D 9/02; F02D 41/0047; F02D 41/22; F02D 13/0207; F02D 2041/001; F02D 2041/0017; F02D 2041/227; F02D 2200/1004; F02D 2250/26; F02M 26/02; F02M 26/64; Y02T 10/144; Y02T 10/47
USPC .................. 60/605.2, 602; 701/108
See application file for complete search history.

(56) References Cited

U.S. PATENT DOCUMENTS 3,842,814 A * 10/1974 Bier .................. F02M 26/55
    123/568.29
4,428,355 A * 1/1984 Yokooku ............ F02D 41/0077
    123/568.16
(Continued)

FOREIGN PATENT DOCUMENTS

JP    2010-255602 A    11/2010

*Primary Examiner* — Thai Ba Trieu
(74) *Attorney, Agent, or Firm* — Sughrue Mion, PLLC (57) ABSTRACT

An internal combustion engine includes a throttle valve, an EGR passage, an EGR valve, a valve mechanism that adjusts opening and closing characteristics of an intake valve or an exhaust valve of the internal combustion engine, and a controller that controls the throttle valve, the EGR valve and the valve mechanism, based on request torque that is requested of the internal combustion engine. The controller is configured to execute evacuation traveling control that operates the throttle valve to fully open, calculates a target intake air flow amount for achieving the request torque based on an effective opening area of the EGR valve which is stuck, and operates the valve mechanism in accordance with the target intake air flow amount, in at least one time period while the request torque is reducing when the EGR valve is stuck in an open state.

5 Claims, 4 Drawing Sheets

(51) Int. Cl.
*F02D 9/02* (2006.01)
*F02M 26/02* (2016.01)
*F02M 26/64* (2016.01)
*F02D 13/02* (2006.01)

(56) References Cited

U.S. PATENT DOCUMENTS

| | | | | |
|---|---|---|---|---|
| 7,392,797 | B2* | 7/2008 | Ogawa | F02D 41/221 123/568.16 |
| 7,516,009 | B1* | 4/2009 | Han | F02D 41/0007 701/114 |
| 8,683,977 | B2* | 4/2014 | Miyashita | F02D 41/0087 123/568.16 |
| 8,788,180 | B2* | 7/2014 | Irisawa | F02D 41/0055 123/568.16 |
| 2009/0076716 | A1* | 3/2009 | Han | F02D 41/221 701/115 |
| 2011/0023829 | A1* | 2/2011 | Miyashita | F02D 41/0087 123/568.16 |
| 2012/0132184 | A1* | 5/2012 | Irisawa | F02D 41/0055 123/568.11 |
| 2013/0319383 | A1* | 12/2013 | Yoshioka | F02D 41/0077 123/568.21 |
| 2014/0196527 | A1* | 7/2014 | Bossmeyer | F02D 21/08 73/114.74 |
| 2015/0361872 | A1* | 12/2015 | Takaki | F02D 41/0077 123/568.11 |
| 2016/0160811 | A1* | 6/2016 | Deb | F02D 41/221 |
| 2018/0119652 | A1* | 5/2018 | Dixon | F02M 26/50 |

* cited by examiner

Fig. 4

CONTROL APPARATUS FOR INTERNAL COMBUSTION ENGINE

FIELD

The present disclosure relates to a control apparatus for an internal combustion engine, and particularly relates to a control apparatus for an internal combustion engine that performs an exhaust gas recirculation (Exhaust Gas Recirculation; EGR) operation that recirculates a part of gas discharged from the internal combustion engine into cylinders.

BACKGROUND

Conventionally, for example, JP2010-255602A has disclosed an apparatus that adjusts an operating line of an internal combustion engine by using a load adjustment by an operation of a generator and adjustment of a throttle valve opening degree so that a differential pressure between an intake pressure and an exhaust pressure becomes substantially zero when an EGR valve is determined to be stuck open. The differential pressure between the intake pressure and the exhaust pressure becomes substantially zero, and thereby combustion worsening that occurs due to an excessive flow amount of exhaust gas (flow amount of EGR gas) that is recirculated into cylinders is suppressed.

SUMMARY

Incidentally, when an EGR valve is stuck in an open state while the vehicle loaded with an internal combustion engine is traveling, it is required to decelerate the vehicle safely while preventing a misfire due to an excessive EGR gas flow amount. Here, in the torque reducing process in which the vehicle decelerates, the amount of air that is taken into the cylinders is decreased in response to reduction in request torque. When the air amount is decreased by operating the throttle valve to a closing side at this time, there arises the fear that the differential pressure between the intake pressure and the exhaust pressure increases and the EGR gas flow rate increases. In that case, there arises the fear that a misfire during torque reduction cannot be prevented, and safe deceleration cannot be realized.

The present disclosure is made in the light of the problem as described above, and has an object to provide an exhaust gas recirculation apparatus for an internal combustion engine capable of reducing torque safely while restraining a recirculation amount of EGR from becoming excessive when an EGR valve is stuck in an open state.

In order to solve the above described problem, a first disclosure is a control apparatus for an internal combustion engine, including a throttle valve installed in an intake passage of an internal combustion engine, an EGR passage that connects an exhaust passage of the internal combustion engine, and an intake downstream side of the throttle valve in the intake passage, an EGR valve that is installed in a middle of the EGR passage, and adjusts an effective opening area of the EGR passage, a valve mechanism that adjusts opening and closing characteristics of an intake valve or an exhaust valve of the internal combustion engine, and a controller that controls the throttle valve and the valve mechanism, based on request torque that is requested of the internal combustion engine. The controller is configured to execute evacuation traveling control that operates the throttle valve to fully open, calculates a target intake air flow amount that is a target value of an intake air flow amount for achieving the request torque based on the effective opening area in a case of the EGR valve being stuck in an open state, and operates the valve mechanism in accordance with the target intake air flow amount, in at least one time period while the request torque is reducing when the EGR valve is stuck in an open state.

A second disclosure is, in the first disclosure, such that the controller is configured to calculate the target intake air flow amount to be a larger value as the effective opening area of the EGR valve is larger, in the evacuation traveling control.

A third disclosure is, in the first disclosure, such that the controller is configured to restrict execution of the evacuation traveling control when the effective opening area of the EGR valve is smaller than a predetermined lower limit threshold value, when the EGR valve is stuck in an open state.

A fourth disclosure further includes, in the first disclosure, a supercharger having a compressor that is provided at an intake upstream side from a connection portion to the EGR passage in the intake passage. The controller is configured to determine that the EGR valve is stuck in an open state when there is a flow of gas from the intake passage to the exhaust passage in the EGR passage, in a time period in which a supercharging operation by the supercharger is performed and the EGR valve is operated to be fully closed.

A fifth disclosure is a control apparatus for an internal combustion engine, including a throttle valve installed in an intake passage of an internal combustion engine, an EGR passage that connects an exhaust passage of the internal combustion engine, and an intake downstream side of the throttle valve in the intake passage, an EGR valve that is installed in a middle of the EGR passage, and adjusts an effective opening area of the EGR passage, a valve mechanism that adjusts a valve timing of an intake valve or an exhaust valve of the internal combustion engine, and a controller that controls the throttle valve, the EGR valve and the valve mechanism, based on request torque that is requested of the internal combustion engine. The controller is configured to execute evacuation traveling control that operates the throttle valve to fully open, and operates the valve mechanism in a direction to reduce a charging efficiency of intake air that is taken into a cylinder of the internal combustion engine, in at least one time period while the request torque is reducing when the EGR valve is stuck in an open state.

A sixth disclosure is, in the fifth disclosure, such that the controller is configured to restrict execution of the evacuation traveling control when an effective opening area of the EGR valve is smaller than a predetermined lower limit threshold value in a case where the EGR valve is stuck in an open state.

According to the first disclosure, the evacuation traveling control that operates the throttle valve to fully open, calculates the target intake air flow amount for realizing the request torque, based on the effective opening area in the case of the EGR valve being stuck, and operates the valve mechanism in accordance with the target intake air flow amount is executed in at least one time period while the request torque is reducing when the EGR valve is stuck in an open state. When the throttle valve is operated to fully open, the pressure difference between the intake passage and the exhaust passage becomes small. Thereby, a recirculation amount of EGR gas can be restrained from becoming excessively large, so that generation of a torque variation by a misfire can be prevented.

Further, the flow amount of EGR gas taken into the cylinders changes in accordance with the effective opening area of the EGR valve. Consequently, according to the present disclosure, by operating the valve mechanism in accordance with the target air amount calculated based on the effective opening area of the EGR valve which is stuck, the request torque which reduces can be realized while the throttle valve is operated to fully open. In this way, according to the present disclosure, it becomes possible to reduce torque safely while restraining the recirculation amount of EGR gas from being excessively large when the EGR valve is stuck in an open state.

According to the second disclosure, in the evacuation traveling control, as the effective opening area of the EGR valve is larger, the target intake air flow amount is set at a larger value. As the effective opening area of the EGR valve is larger, the EGR gas flow amount increases under the same conditions. Consequently, according to the present disclosure, the target air amount can be precisely calculated based on the EGR gas flow amount.

According to the third disclosure, when the effective opening area of the EGR valve is smaller than the predetermined lower limit threshold value, execution of the evacuation traveling control is restricted. Thereby, necessity or unnecessity of execution of the evacuation traveling control can be determined based on the effective opening area in the state where the EGR valve is stuck open, that is, the degree of the EGR gas recirculation amount, so that it becomes possible to avoid execution of unnecessary evacuation traveling control.

According to the fourth disclosure, it is determined that the EGR valve is stuck in an open state when there is a backflow of gas from the intake passage side to the exhaust passage side through the EGR passage during a supercharging operation by the supercharger. During supercharging operation by the supercharger, a backflow of gas easily occurs, due to the pressure at the intake passage side in the EGR passage becoming higher than the pressure at the exhaust passage side. Consequently, according to the present disclosure, it becomes possible to determine whether or not the EGR valve is stuck in an open state with high precision.

According to the fifth disclosure, the evacuation traveling control that operates the throttle valve to fully open, and operates the valve mechanism in the direction to decrease the charging efficiency, in at least one time period while the request torque is reducing when the EGR valve is stuck in an open state. When the throttle valve is operated to fully open, the pressure difference between the intake passage and the exhaust passage becomes small. Thereby, the recirculation amount of EGR gas can be restrained from becoming excessively large, so that occurrence of a misfire can be prevented. Further, while the request torque is reducing, the charging efficiency is decreased by operation of the valve mechanism, so that the request torque which is reducing can be realized while the throttle valve is operated to fully open. In this way, according to the present disclosure, it becomes possible to reduce torque safely while restraining the recirculation amount of EGR gas from becoming excessively large when the EGR valve is stuck in an open state.

According to the sixth disclosure, when the effective opening area of the EGR valve is smaller than the predetermined lower limit threshold value, execution of the evacuation traveling control is restricted. Thereby, necessity or unnecessity of execution of the evacuation traveling control can be determined based on the effective opening area in the state where the EGR valve is stuck open, that is, the degree of the EGR gas recirculation amount, so that it becomes possible to avoid execution of unnecessary evacuation traveling control.

DESCRIPTION OF EMBODIMENTS

Hereinafter, an embodiment of the present disclosure will be described with reference to the drawings. Note that when the numerals of the numbers, the quantities, the amounts, the ranges and the like of the respective elements are mentioned in the embodiment shown as follows, the present disclosure is not limited to the mentioned numerals unless specially explicitly described otherwise, or unless the disclosure is explicitly specified by the numerals theoretically. Further, the structures, steps and the like that are described in the embodiment shown as follows are not always indispensable to the disclosure unless specially explicitly shown otherwise, or unless the disclosure is explicitly specified by the structures, steps and the like theoretically.

First Embodiment

Hereinafter, a first embodiment of the present disclosure will be described with reference to the drawings.

Configuration of First Embodiment

Figure 1:
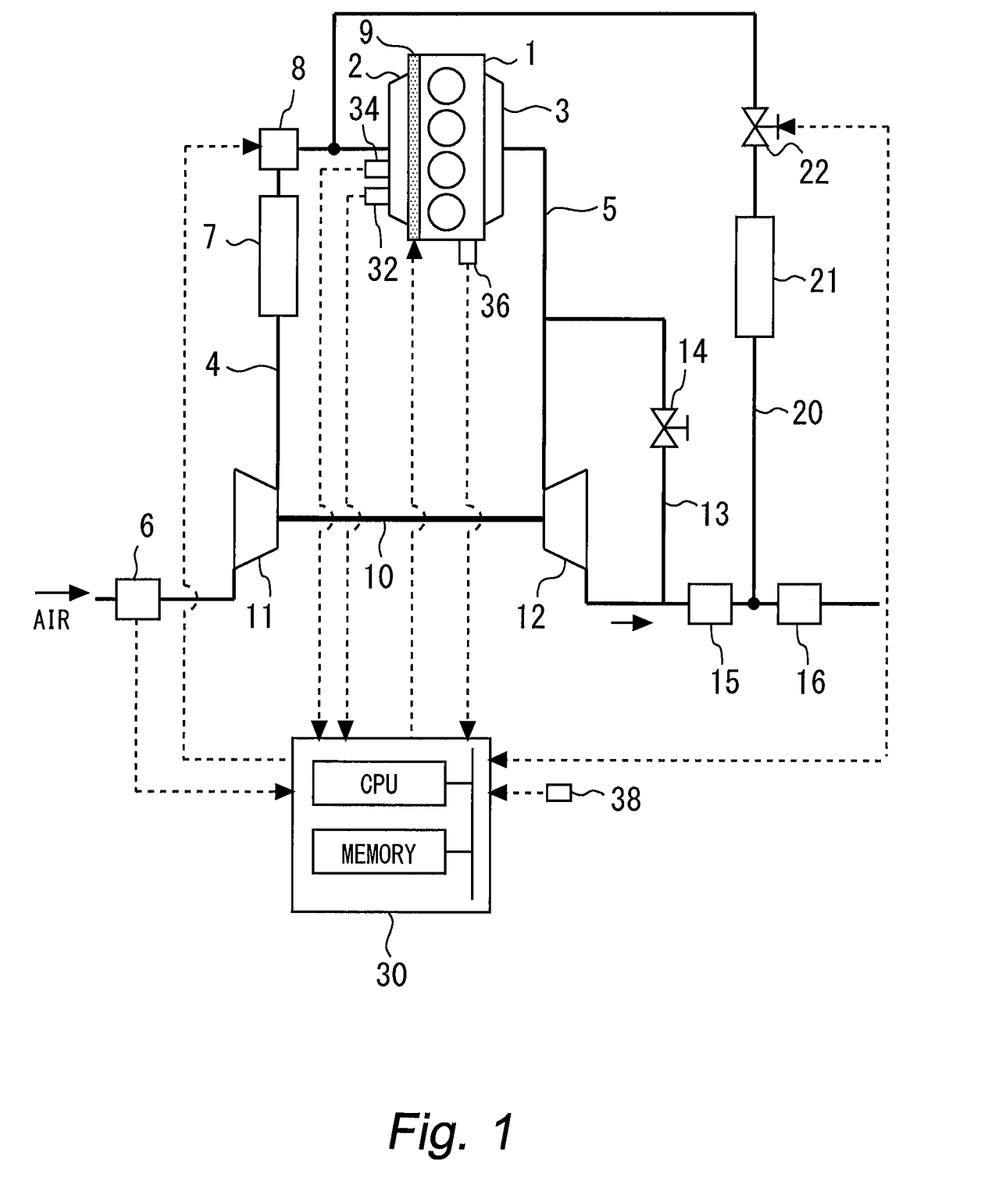
FIG. 1 is a diagram illustrating an entire configuration of an engine to which a control apparatus according to a first embodiment of the present disclosure is applied.

FIG. 1 is a diagram illustrating an entire configuration of an engine to which a control apparatus according to the first embodiment of the present disclosure is applied. The engine of the present embodiment is a spark ignition type engine equipped with a supercharger. The engine is loaded on a vehicle as a power source. The engine may be an engine equipped with no supercharger. An engine main body 1 of the engine includes a plurality of cylinders. FIG. 1 illustrates an example in which four cylinders are disposed in series, but the number of cylinders and arrangement of the cylinders are not limited. The engine main body 1 is provided with a variable intake valve timing mechanism (hereinafter, IN-VVT) 9 that adjusts opening and closing phases of an intake valve, as a valve mechanism that adjusts opening and closing characteristics of the intake valve.

An intake manifold 2 is mounted to an intake side of the engine main body 1. Fresh air that is taken into an intake passage 4 from an air cleaner not illustrated is supplied to the respective cylinders of the engine main body 1 via the intake manifold 2. An air flow meter 6 that outputs a signal corresponding to a flow amount (a mass flow amount) of the fresh air taken into the intake passage 4 is provided downstream of the air cleaner in the intake passage 4. A compressor 11 of a supercharger 10 is provided downstream of the air flow meter 6 in the intake passage 4. An intercooler 7 is provided downstream of the compressor 11 in the intake passage 4. A throttle valve 8 is provided downstream of the intercooler 7 in the intake passage 4. The intake manifold 2 is provided with a temperature sensor 32 for detecting a temperature (hereinafter, an intake manifold temperature Tb) of intake air in the intake manifold 2, and a pressure sensor 34 for detecting a pressure (hereinafter, an intake manifold pressure Pb) in the intake manifold 2.

An exhaust manifold 3 is mounted to an exhaust side of the engine main body 1. Exhaust gas exhausted to the exhaust manifold 3 from the respective cylinders of the engine main body 1 is released into the atmosphere via an exhaust passage 5. The exhaust passage 5 is provided with a turbine 12 of a supercharger 10. An exhaust bypass passage 13 that bypasses the turbine 12 is connected to the exhaust passage 5. In the exhaust bypass passage 13, a wastegate valve 14 is disposed as a bypass valve that opens and closes the exhaust bypass passage 13. A start catalyst (hereinafter, "S/C") 15 that is used in purification of exhaust gas is provided downstream of a position in the exhaust passage 5, to which the exhaust bypass passage 13 is connected. Further, an underfloor catalyst (hereinafter, "U/F") 16 that is used in purification of exhaust gas is provided downstream of the S/C 15 in the exhaust passage 5.

The control apparatus according to the present embodiment includes an EGR passage 20 that connects a downstream side of the S/C 15 and an upstream side of the U/F 16 in the exhaust passage 5, and a downstream side of the throttle valve 8 in the intake passage 4. In the EGR passage 20, an EGR cooler 21 and an EGR valve 22 are provided in sequence from an exhaust side.

The engine configured as above is controlled by a controller 30. The controller 30 is an ECU (Electronic Control Unit). The ECU 30 includes at least an input/output interface, a memory and a CPU (a processor). The input/output interface is provided to take in sensor signals from various sensors attached to the engine, and output operation signals to actuators included by the internal combustion engine. The sensors from which the ECU 30 takes in signals include various sensors necessary to control the engine such as a crank angle sensor 36 that detects a rotation angle of a crankshaft, and an accelerator position sensor 38 that detects a depressing amount on an accelerator pedal in addition to the temperature sensor 32 and the pressure sensor 34 described above. Actuators to which the ECU 30 issues operation signals include various actuators such as the throttle valve 8, the IN-VVT 9 and the EGR valve 22. Memory stores various control programs for controlling the internal combustion engine, maps and the like. The CPU (processor) reads the control program or the like from the memory and executes the control program or the like to generate operation signals based on the sensor signals which are taken in.

Operation of First Embodiment

The system of the first embodiment includes the EGR passage 20 that connects the downstream side of the S/C 15 in the exhaust passage 5 and the downstream side of the throttle valve 8 in the intake passage 4. The EGR passage 20 is provided with the EGR valve 22. The EGR valve 22 adjusts an EGR rate that is a ratio of an amount of EGR gas that is recirculated into the cylinders via the EGR passage 20 to entire intake air in the cylinders. The ECU 30 calculates a target EGR rate based on an operating state such as an engine speed Ne calculated from a detection signal of the crank angle sensor 36, and request torque calculated based on a detection signal of the accelerator position sensor 38, and the like. The ECU 30 calculates an instruction value of an opening degree to the EGR valve 22, for realizing the target EGR rate, and operates the opening degree of the EGR valve 22 in accordance with the instruction value.

Here, so-called stuck open that is a valve body being stuck in an open state sometimes occurs to the EGR valve 22. When the EGR valve 22 is stuck open, the EGR gas flow amount may become excessively large at the time of deceleration of the vehicle at which the intake manifold pressure is reduced. In this case, there is the fear that a torque variation due to a misfire occurs so that the request torque cannot be satisfied.

Therefore, the system of the present embodiment executes evacuation traveling control at the time of deceleration of the engine at which the request torque reduces when the EGR valve 22 is stuck open. In the evacuation traveling control, the throttle valve 8 is operated to fully open, and the IN-VVT 9 is operated in a direction to decrease charging efficiency of intake air that is taken into the cylinders. Note that "fully open" of the throttle valve 8 which is used in the description is defined as an opening degree that includes not only the maximum opening degree realizable by the throttle valve 8 but also a range in a vicinity of an effective opening area equivalent to the maximum opening degree. Hereinafter, specific operations of the evacuation traveling control and control accompanying the evacuation traveling control will be described in sequence.

Determination of EGR Valve Being Stuck Open

Determination of being stuck open is determination of whether or not the EGR valve 22 is stuck open. The ECU 30 calculates an EGR gas flow amount Gegr that is taken into the cylinders of the engine from the EGR passage 20 by using expression (1) as follows in a time period in which the instruction value to the EGR valve 22 is fully closing. Note that in expression (1), Ga_eng represents an intake air flow amount taken into the cylinders of the engine, and Ga_afm represents a fresh air flow amount detected by the air flow meter 6 respectively.

[Mathematical expression 1]

$$Gegr = Ga\_eng - Ga\_afm \qquad (1)$$

The intake air flow amount Ga_eng in expression (1) can be calculated by using expression (2) as follows. Note that in expression (2), ρB represents a density of air in the intake manifold 2, ηvB represents a charging efficiency of air into the cylinders, Ne represents an engine speed, and V represents an exhaust gas amount of the engine, respectively. The density ρB can be calculated by using the intake manifold pressure Pb and the intake manifold temperature Tb which are detected. The air charging efficiency ηvB can be calculated based on present valve timings of the intake valve and the exhaust valve. The engine speed Ne can be detected by the crank angle sensor 36, and the exhaust gas amount V is a characteristic value of the engine.

[Mathematical expression 2]

$$G\_eng = \rho B \cdot \eta v B \cdot Ne \cdot V / 120 \qquad (2)$$

When the EGR gas flow amount Gegr calculated in expression (1) has a negative value, it can be determined that the gas in the EGR passage 20 flows backward to the exhaust side. Consequently, when establishment of Gegr<0 is recognized in a time period in which the instruction value to the EGR valve 22 is full closing, it can be determined that the EGR valve 22 is stuck open. It is preferable to perform determination of presence or absence of stuck open of the EGR valve 22 at a time of acceleration at which a supercharging operation by the supercharger 10 is performed and the intake manifold pressure becomes higher than the atmospheric pressure. This is because as the differential pressure between the intake side and the exhaust side of the EGR valve 22 in the EGR passage 20 is larger, the amount of gas flowing at the time of the EGR valve 22 being stuck open becomes larger. Thereby, presence or absence of stuck open of the EGR valve 22 can be determined with high precision.

Calculation of Effective Opening Area of EGR Valve

Figure 2:
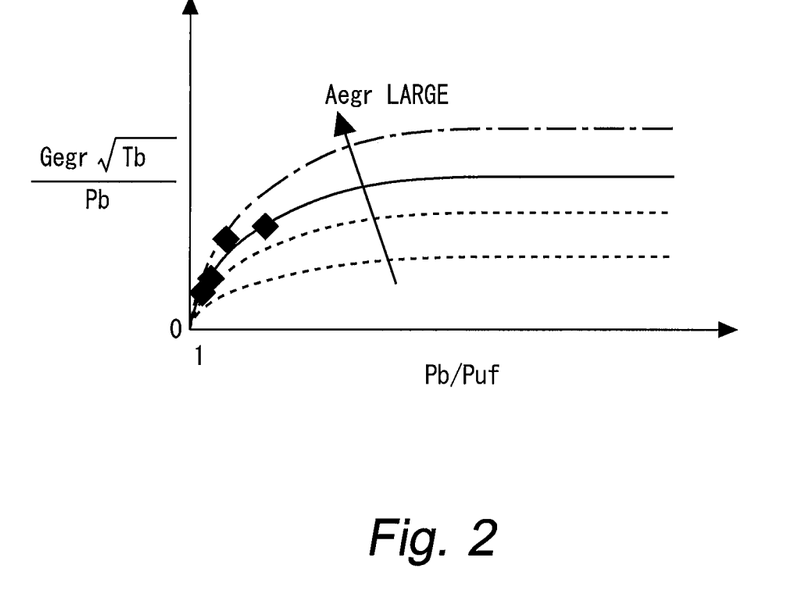
FIG. 2 is a diagram illustrating a pressure loss characteristic of an EGR passage at a time of backflow of EGR gas.

The ECU 30 calculates the effective opening area at the time of acceleration at which the EGR gas flows backward when the EGR valve 22 is stuck open. FIG. 2 is a diagram illustrating a pressure loss characteristic of the EGR passage at the time of backflow of the EGR gas. A horizontal axis in FIG. 2 represents a pressure ratio of upstream and downstream sides of the EGR passage 20, which is expressed as a ratio of the pressure upstream of the U/F 16 (hereinafter, referred to as "U/F upstream pressure Puf") to which the EGR passage 20 is connected, to the intake manifold pressure Pb. A vertical axis in FIG. 2 is a correction flow amount of the EGR passage 20, which is expressed as a value obtained by dividing a value, which is obtained by multiplying a square root of the intake manifold temperature Tb by the EGR gas flow amount Gegr, by the intake manifold pressure Pb. In FIG. 2, a relationship between the pressure ratio of the upstream and downstream sides of the EGR passage 20 and the correction flow amount is drawn at each effective opening area Aegr of the EGR valve 22.

The U/F upstream pressure Puf can be calculated based on a correlation of the intake air flow amount Ga_eng and the U/F upstream pressure Puf. The ECU 30 stores pressure loss characteristics of the EGR passage 20 as illustrated in FIG. 2. Consequently, when the EGR valve 22 is stuck open, the pressure ratio of the upstream and downstream sides in the EGR passage 20 and the correction flow amount are respectively calculated at each combustion cycle, and a plurality of points are plotted in the stored pressure loss characteristics, whereby the effective opening area Aegr of the EGR valve 22 which is stuck can be determined.

Note that as various state quantities for use in the above described determination of the EGR valve 22 being stuck open and estimation of the stuck opening degree, actual values detected by the sensors may be used. Further, in the configuration including the sensor that detects the opening degree of the EGR valve 22, determination of being stuck open and calculation of the effective opening area may be performed based on the actual value obtained from the sensor.

Evacuation Traveling Control

The ECU 30 executes the evacuation traveling control when it is determined that the EGR valve 22 is stuck open. The evacuation traveling control is executed in at least one time period while the request torque is reducing after the effective opening area Aegr of the EGR valve 22 is calculated. In more detail, in the evacuation traveling control, the throttle valve 8 is operated to fully open. Thereby, the differential pressure between the intake manifold pressure Pb and the U/F upstream pressure Puf can be decreased, so that the EGR gas flow amount can be suppressed to a minimum.

Further, in the evacuation traveling control, the IN-VVT 9 is operated to satisfy the request torque. An operation amount INVVT of the IN-VVT 9 is calculated by the following method, for example.

When the EGR gas is introduced into the intake passage 4, a relationship shown in expression (3) as follows is established. Note that in expression (3), Ga represents a flow amount of fresh air that is taken into the cylinders.

[Mathematical expression 3]

$$Ga + Gegr = \rho B \cdot \eta v B \cdot Ne \cdot V/120 \qquad (3)$$

When the EGR valve 22 is stuck open, the EGR gas is introduced into the intake passage 4 during reduction in the request torque when the intake manifold pressure Pb becomes the atmospheric pressure or less. Accordingly, when a target value of the fresh air flow amount Ga necessary to realize the request torque is set as a target fresh air flow amount $Ga_{tgt}$, a target value of the intake air flow amount Ga_eng is set as a target intake air flow amount $Ga\_eng_{tgt}$, and the target fresh air flow amount $Ga_{tgt}$ and the target intake air flow amount $Ga\_eng_{tgt}$ are substituted into expression (3), expression (4) as follows is established.

[Mathematical expression 4]

$$Ga\_eng_{tgt} = \rho B \cdot \eta v B_{tgt} \cdot Ne \cdot V/120$$

$$Ga\_eng_{tgt} = Ga_{tgt} + Gegr \qquad (4)$$

The target fresh air flow amount $Ga_{tgt}$ can be calculated based on the request torque. Further, the EGR gas flow amount Gegr can be calculated from expression (1) described above. Consequently, if a target charging efficiency $\eta v B_{tgt}$ for realizing the target intake air flow amount $Ga\_eng_{tgt}$ is set by using expression (4), the request torque can be realized precisely.

The target charging efficiency $\eta v B_{tgt}$ which is set is realized by operation of the IN-VVT 9. The charging efficiency $\eta v B$ becomes maximum at a timing at which a closing timing (IVC) of the intake valve is slightly at a retardation side from a bottom dead center (BDC), and as IVC is more away from the maximum timing, the charging efficiency $\eta v B$ becomes lower. Consequently, a target value $INVVT_{tgt}$ of an operation amount of the IN-VVT 9 is set at a value by which the closing timing (IVC) of the intake valve is more away from the above described maximum timing as the target charging efficiency $\eta v B_{tgt}$ becomes lower (that is, as the request torque reduces more).

Note that in the above described explanation, the configuration is described, in which the charging efficiency is changed by adjusting the opening and closing phases of the intake valve. However, in place of this or in addition to this, a configuration may be adopted, in which the charging efficiency is changed by adjusting a valve lift amount of the intake valve. Further, a configuration may be adopted in which opening and closing phases or a valve lift amount of the exhaust valve is adjusted, in place of or in addition to the intake valve.

Further, in the evacuation traveling control, a driver of the vehicle may be notified that evacuation traveling by the evacuation traveling control is executed, by a sound, display or the like. Thereby, the driver can understand that abnormality occurs to the vehicle, so that the driver can take an action to stop the vehicle quickly.

According to the evacuation traveling control described above, an unintended torque variation is suppressed by suppressing a misfire during torque reduction, and the request torque during torque reduction can be realized precisely. Thereby, when the EGR valve 22 is stuck open, it becomes possible to decelerate the vehicle safely and stop the vehicle.

Determination of Necessity or Unnecessity of Execution of Evacuation Traveling Control By the aforementioned evacuation traveling control, reduction of the request torque in the case of the EGR valve 22 being stuck open can be realized precisely. Here, even when the EGR valve 22 is stuck open, there is also a possibility that a misfire at the time of torque reduction does not become a problem as in the case where the effective opening area is minimum, and the like. Thus, the system of the present embodiment may execute no evacuation traveling control when the calculated effective opening area Aegr is smaller than a threshold value Aegr_e of the effective opening area in the case where the EGR valve 22 is stuck open. As the threshold value Aegr_e, a value that is obtained by an experiment or the like in advance as the lower limit threshold value of the effective opening area with which a misfire at the time of torque reduction does not become a problem can be used. Thereby, it becomes possible to restrict execution of unnecessary evacuation traveling control.

Specific Example of Evacuation Traveling Control

Figure 3:
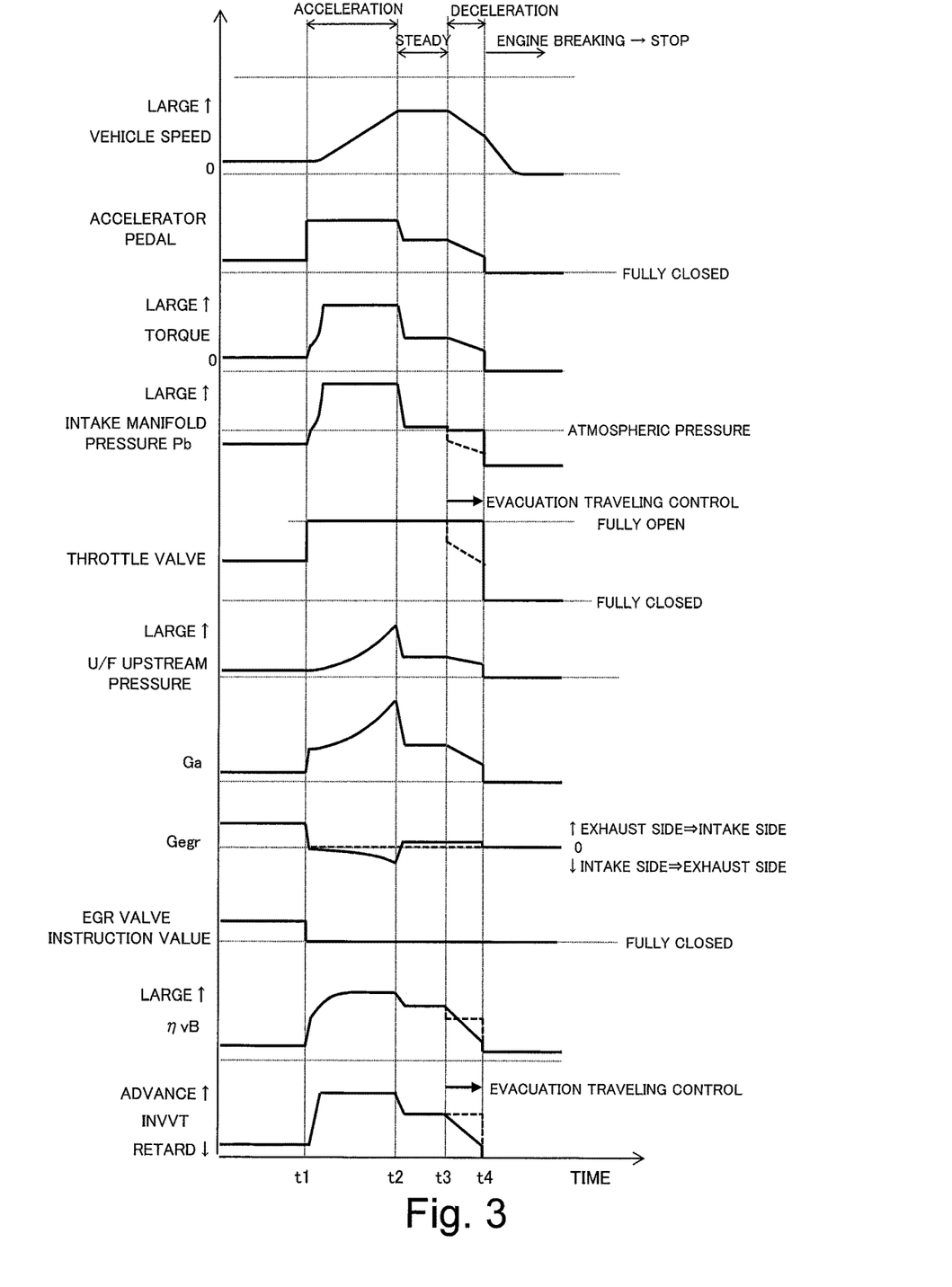
FIG. 3 is a time chart illustrating changes of various state quantities in evacuation travelling control.

Next, with reference to a time chart, the evacuation traveling control which is executed in the first embodiment will be described in more detail. FIG. 3 is a time chart illustrating changes in various state quantities in the evacuation traveling control. An example of the chart illustrates a chart of an operation of starting acceleration of the vehicle at a time point t1, shifting to steady traveling in a high-speed state at a time point t2, starting deceleration of the vehicle at a time point t3, and stopping combustion of the engine at a time point t4 to stop the vehicle. The operation of the vehicle like this corresponds to the case in which the vehicle is accelerated to pass another vehicle, or change lane to another lane, for example, and thereafter the high-speed state is kept, after which, the vehicle is decelerated to stop the vehicle. In FIG. 3, a chart in a first tier shows a temporal change in a vehicle speed, and a chart in a second tier shows a temporal change in a position of the accelerator pedal. A chart in a third tier shows a temporal change in torque of the engine. A chart in a fourth tier shows a temporal change in the intake manifold pressure Pb. A chart in a fifth tier shows a temporal change in the opening degree of the throttle valve. A chart in a sixth tier shows a temporal change in the U/F upstream pressure Puf. A chart in a seventh tier shows a temporal change in the fresh air flow amount Ga. A chart in an eighth tier shows a temporal change in the EGR gas flow amount Gegr. A chart in a ninth tier shows a temporal change in an instruction value to the EGR valve 22. A chart in a tenth tier shows a temporal change in the charging efficiency ηvB. A chart in an eleventh tier shows a temporal change in the operation amount INVVT of the IN-VVT 9. Further, FIG. 3 illustrates the charts in the case of the EGR valve 22 being stuck open by solid lines, and illustrates the charts as comparative example in the case of the EGR valve 22 is not stuck open by chain lines.

In the examples of the charts illustrated in FIG. 3, the throttle valve 8 is operated to fully open, and the instruction value to the EGR valve 22 indicates full closure, when the accelerator pedal is depressed at the time point t1, and acceleration of the vehicle is started. In the charts of the solid lines in which the EGR valve 22 is stuck open, fresh air flows back in the EGR passage 20 during acceleration after the time point t1. Determination of whether or not the EGR valve 22 is stuck open described above is performed in an acceleration time period after the time point t1.

In the examples of the charts illustrated in FIG. 3, the depressed accelerator pedal is slightly returned at the time point t2, and thereby steady traveling at a high-speed after acceleration is started. In the steady traveling after the time point t2, an operation for keeping a supercharging pressure in a supercharging region in the vicinity of the atmospheric pressure is performed in order to keep the vehicle speed at a high-speed. In the examples of the charts illustrated in FIG. 3, the throttle valve 8 is kept to fully open, and the IN-VVT is operated in a direction (the retardation side in this case) to decrease the charging efficiency for the purpose of reducing the pump loss. Estimation of the effective opening area of the EGR valve 22 described above is performed in acceleration after the time point t1 through the steady traveling, after it is determined that the EGR valve 22 is stuck open.

When the accelerator pedal is gradually returned after the time point t3, the request torque reduces correspondingly. When the EGR valve 22 is not stuck open at this time, there is no fear that the EGR gas is introduced even when the intake manifold pressure Pb becomes lower than the U/F upstream pressure. Consequently, as illustrated by the chain lines in the chart illustrated in FIG. 3, in the case of the comparative example in which the EGR valve 22 is not stuck open, torque reduction is realized by gradually operating the throttle valve 8 to a closing side after the time point t3.

If the throttle valve 8 is operated to the closing side when the EGR valve 22 is stuck open, there is a fear that a misfire is caused by a large amount of EGR gas being introduced and the request torque cannot be realized. Thus, in the system of the first embodiment, the evacuation traveling control is performed at the time point t3 at which the request torque reduces. In the evacuation traveling control in this case, the throttle valve 8 is operated to fully open, and the IN-VVT 9 is operated to decrease the charging efficiency ηvB (retardation side).

At the time point t4, the accelerator pedal position is returned to full closure. Thereby, firing of the engine is stopped, so that the throttle valve 8 is fully closed and deceleration by engine braking is performed. In this way, according to the system of the first embodiment, in the case where the EGR valve 22 is stuck open, it becomes possible to realize the request torque in the deceleration process precisely and stop the vehicle safely, even in deceleration from high-speed traveling.

Specific Processing in First Embodiment

Figure 4:
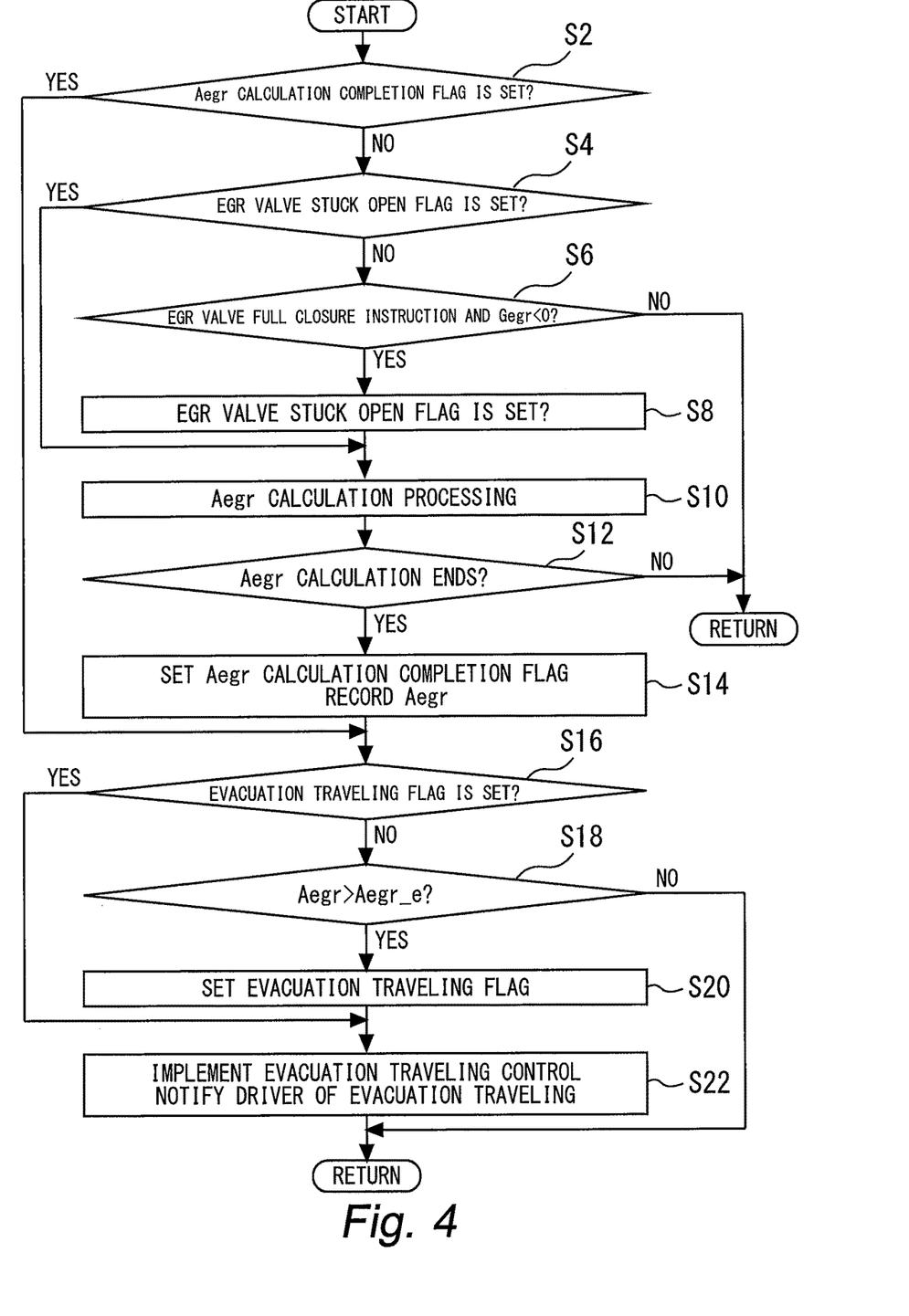
FIG. 4 is a flowchart illustrating a routine for evacuation travel control executed by an ECU of the first embodiment of the present disclosure.

Subsequently, specific processing in the aforementioned evacuation traveling control will be described in detail by using a flowchart. FIG. 4 is a flowchart illustrating a routine for the evacuation traveling control executed by the ECU 30 of the first embodiment of the present disclosure. Note that the routine illustrated in FIG. 4 is repeatedly executed at predetermined arithmetic operation periods.

In the routine illustrated in FIG. 4, it is determined whether or not an Aegr calculation completion flag is set (step S2). The Aegr calculation completion flag is a flag that is set when calculation of the effective opening area Aegr of the EGR valve 22 is completed. When the Aegr calculation completion flag is set as a result, the flow goes to step S16 described later. When the Aegr calculation completion flag is not set, the flow goes to a next step, and it is determined whether or not the EGR valve stuck open flag is set (step S4). The EGR valve stuck open flag is a flag that is set when it is determined that the EGR valve 22 is stuck open. When the EGR valve stuck open flag is set as a result, the flow goes to step S10 described later. When the EGR valve stuck open flag is not set, the flow goes to a next step.

In the next step, it is determined whether or not the instruction value to the EGR valve 22 is full closure and the EGR gas flow amount Gegr<0 is established (step S6). When establishment of the determination is not recognized as a result, it can be determined that the conditions for determining whether the EGR valve 22 is stuck open are not established or the EGR valve 22 is not stuck open. In this case, the present routine is ended, and the processing is executed from the processing in step S2 again in the next arithmetic operation period. When establishment of the determination is recognized in the processing in step S6 described above, it can be determined that the EGR valve 22 is stuck open. In this case, the flow goes to a next step, and the EGR valve stuck open flag is set (step S8).

When the EGR valve stuck open flag is set, calculation processing of Aegr is executed next (step S10). The ECU 30 stores the pressure loss characteristics of the EGR passage illustrated in FIG. 2. Here, more specifically, the U/F upstream pressure Puf, the intake manifold pressure Pb, the EGR gas flow amount Gegr and the intake manifold temperature Tb are acquired. Subsequently, processing of plotting the pressure ratio Pb/Puf and the correction flow amount Gegr·($\sqrt{Tb}$)/Pb which are calculated onto the pressure loss characteristics illustrated in FIG. 2 is performed.

Subsequently, it is determined whether or not calculation of Aegr is completed (step S12). Here, it is determined whether or not the number of times of execution of the processing in step S10 reaches a predetermined number of times. Note that as the predetermined number of times in this case, a value set in advance is used as the number of samplings capable of identifying Aegr from the pressure loss characteristics of the EGR passage. When it is determined that calculation of Aegr is not completed yet as a result, the present routine is ended. When it is determined that calculation of Aegr is completed in step S12 described above, the flow goes to a next step. In the next step, the Aegr calculation completion flag is set, and the identified effective opening area Aegr is stored (step S14).

In the routine illustrated in FIG. 4, it is determined whether or not an evacuation traveling flag is set next (step S16). The evacuation traveling flag is a flag that is set when it is determined that execution of the evacuation traveling control is necessary. When the evacuation traveling flag is set as a result, the flow goes to processing in step S22 described later. When the evacuation traveling flag is not set, the flow goes to a next step, and it is determined whether Aegr stored in step S14 is larger than the threshold value Aegr_e (step S18). As described above, Aegr_e is a lower limit threshold value of the effective opening area with which a misfire at the time of torque reduction does not become a problem. When establishment of Aegr>Aegr_e is not recognized as a result, it is determined that a misfire at the time of torque reduction does not become a problem, and the present routine is ended. When establishment of Aegr>Aegr_e is recognized, it is determined that a misfire at the time of torque reduction becomes a problem, and the evacuation traveling flag is set (step S20).

When the evacuation traveling flag is set, the evacuation traveling control is executed (step S22). In the evacuation traveling control, at least in one time period while the request torque is reducing, the opening degree of the throttle valve is operated to fully open, and the IN-VVT 9 is operated to decrease the charging efficiency. In more detail, the ECU 30 calculates the target charging efficiency $\eta vB_{tgt}$ for realizing the target fresh air flow amount $Ga_{tgt}$ based on the target fresh air flow amount $Ga_{tgt}$ calculated from the request torque and the EGR gas flow amount Gegr by using expression (4). Subsequently, the ECU 30 determines the $INVVT_{tgt}$ for realizing the target charging efficiency $\eta vB_{tgt}$, and operates the IN-VVT 9 in accordance with the determined $INVVT_{tgt}$. When the evacuation traveling control is executed, the driver of the vehicle is notified that the evacuation traveling is executed by a sound, display or the like.

In this way, according to the system of the first embodiment, the EGR gas flow amount can be suppressed to the minimum when the EGR valve 22 is stuck open, so that a torque variation due to a misfire can be suppressed. Further, the generated torque in the process of the request torque reducing can be precisely realized, so that it becomes possible to stop the vehicle safely.

Incidentally, in the system of the aforementioned first embodiment, the EGR device including the EGR passage 20 that connects the upstream side of the U/F 16 in the exhaust passage 5 and the downstream side of the throttle valve 8 in the intake passage 4 is described. However, the configuration of the EGR device of the system of the first embodiment is not limited to this. That is, in the case of the EGR valve 22 being stuck open, the EGR device may be configured as another EGR device such as an HPL-EGR device that connects the exhaust manifold 3 and the intake manifold 2 by the EGR passage as long as the EGR device has the configuration in which the EGR gas is introduced during torque reduction.

Further, the ECU 30 included by the engine of the first embodiment may be configured as follows. The respective functions of the ECU 30 may be realized by a processing circuit. The processing circuit of the ECU 30 may include at least one processor and at least one memory. When the processing circuit includes at least one processor and at least one memory, the respective functions of the ECU 30 may be realized by software, firmware, or a combination of the software and the firmware. At least one of the software and the firmware may be written as a program. At least one of the software and the firmware may be stored in at least one memory. At least one processor may realize the respective functions of the control unit by reading and executing the program stored in at least one memory. At least one memory may include a nonvolatile or volatile semiconductor memory or the like.

Further, the processing circuit of the ECU 30 may include at least one exclusive hardware. When the processing circuit includes at least one exclusive hardware, the processing circuit may be, for example, a single circuit, a composite circuit, a programmed processor, a parallel-programmed processor, ASIC (Application Specific Integrated Circuit), FPGA (Field-Programmable Gate Array), or a combination of them. The functions of the respective sections of the ECU 30 may be respectively realized by processing circuits. Further, the functions of the respective sections of the ECU 30 may be collectively realized by the processing circuit. Some of the respective functions of the ECU 30 may be realized by exclusive hardware, and the other functions may be realized by software or firmware. The processing circuit may realize the respective functions of the ECU 30 by hardware, software, firmware, or a combination of them.

What is claimed is:

1. An internal combustion engine, comprising:
a throttle valve installed in an intake passage of the internal combustion engine;
an EGR passage connecting an exhaust passage of the internal combustion engine to the intake passage at a downstream side of the throttle valve;
an EGR valve installed in a middle of the EGR passage to adjust an effective opening area of the EGR passage;
a valve mechanism adjusting an opening degree of an intake valve of the internal combustion engine; and
a controller configured to execute instructions stored on a non-transitory memory, wherein the controller, when executing the instructions,
determines that the EGR valve is stuck in an open state; and
executes an evacuation travelling control based on requested engine torque of operating the throttle valve to a fully open position and operating the valve mechanism to adjust the opening degree of the intake valve in a direction to reduce a charging efficiency of intake air being supplied into a cylinder of the internal combustion engine at a time to reduce the requested torque.

2. The internal combustion engine according to claim 1, wherein the controller, when executing the instructions, restricts execution of the evacuation traveling control when the effective opening area of the EGR valve is smaller than a predetermined lower limit threshold value while the EGR valve is stuck in the open state.

3. An internal combustion engine, comprising:
a throttle valve installed in an intake passage of the internal combustion engine;
an EGR passage connecting an exhaust passage of the internal combustion engine to the intake passage at a downstream side of the throttle valve;
an EGR valve installed in a middle of the EGR passage to adjust an effective opening area of the EGR passage;
a valve mechanism adjusting an opening degree of an intake valve of the internal combustion engine; and
a controller configured to execute instructions stored on a non-transitory memory,
wherein the controller, when executing the instructions, determines that the EGR valve is stuck in an open state, and
executes an evacuation traveling control in at least one time period while a request torque, which is a requested torque of the internal combustion engine, is reducing,
wherein the evacuation traveling control includes:
controlling operation of the throttle valve to fully open the throttle valve,
calculating a target fresh air flow amount that is a target value of a fresh air flow amount for achieving the request torque,
calculating an EGR gas amount passing through the EGR valve by subtracting a fresh air flow amount taken into the intake passage from an intake air flow amount taken into cylinders of the internal combustion engine,
calculating a target intake air flow amount that is a target value of an intake air flow amount for achieving the request torque by adding the EGR gas amount passing through the EGR valve to the target fresh air flow amount,
calculating a target charging efficiency that is a target value of a charging efficiency for realizing the target intake air flow amount, and
operating the valve mechanism such that the charging efficiency becomes the target charging efficiency.

4. The internal combustion engine according to claim 3, wherein the controller, when executing the instructions, restricts execution of the evacuation traveling control when the effective opening area of the EGR valve is smaller than a predetermined lower limit threshold value while the EGR valve is stuck in the open state.

5. The internal combustion engine according to claim 3, further comprising:
a supercharger having a compressor provided in the intake passage upstream of a connection portion with respect to the EGR passage in the intake passage and driven by a turbine provided in the exhaust passage,
wherein the controller, when executing the instructions, determines that the EGR valve is stuck in the open state when a flow of gas is flowing from the intake passage back to the exhaust passage in the EGR passage.

* * * * *